Patented June 27, 1944

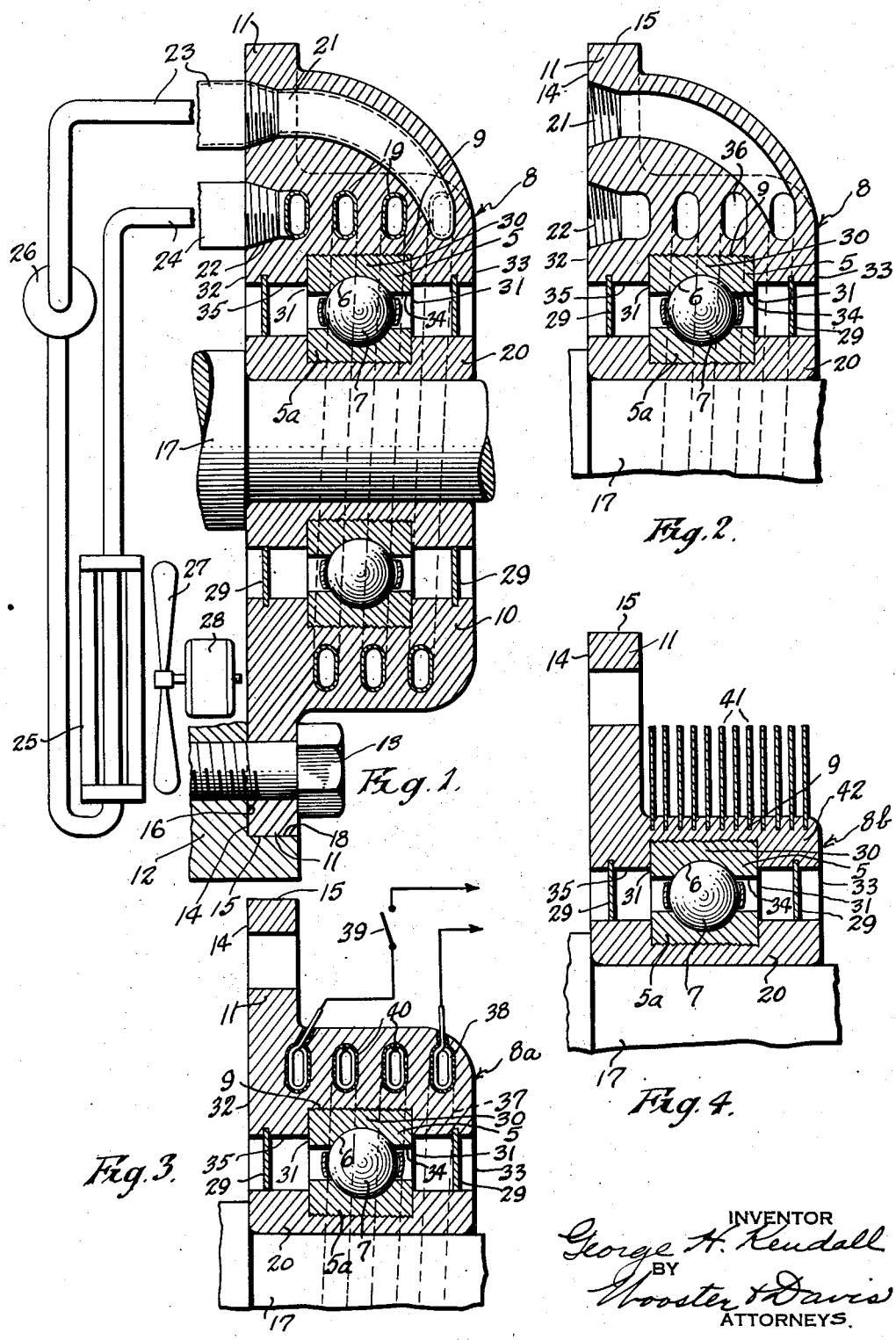

2,352,206

UNITED STATES PATENT OFFICE 2,352,206

CONTROLLED TEMPERATURE BEARING

George H. Kendall, Noroton Heights, Conn.

Application February 7, 1942, Serial No. 429,879

5 Claims. (Cl. 308—77)

This invention relates to an antifriction bearing, particularly to this type of bearing and a temperature control means for controlling the temperature of the bearing, and has for an object to provide an improved antifriction bearing with a construction for controlling the temperature thereof which will be more efficient and less complicated than similar types of construction now generally employed.

It is also an object to provide a construction in which the bearing may be either heated or cooled depending on the application for which it is used and the conditions as to temperature under which it is to operate, such for example as outdoor year-around application, examples of which are railway signal control systems, boats, automotive traffic, airplanes, etc., that are required to function perfectly in the hottest weather or in below-zero winter weather for days at a time.

A further object is to provide a controlled temperature bearing of simplified construction which will eliminate the multiplicity of chucking errors in the manufacture and mounting of the standard type of antifriction bearing now generally employed, and particularly to form a construction of this type of bearing in which the supporting and locating surfaces for the bearing are in exact radial and axial concentric alignment with the bearing raceway surfaces.

Another object is to provide a construction in which the errors of eccentricity and of wobble of each of a plurality of parts required in the standard bearing are eliminated.

A further object is to provide a construction in which a large number of the many machining operations in making the bearing and housing or frame fits, etc., are greatly reduced or eliminated, thus greatly reducing the number of parts required for making the complete assembly as well as reducing the time required for making and assembling, and therefore not only increasing the accuracy with a much smaller percentage of rejections but also greatly reducing the cost of the bearing and its assembly in the housing or frame structure of the machine or apparatus with which it is used.

A still further object is to provide a construction of controlled temperature bearing which is so constructed that the heat transfer between the rolling elements and their raceway and the temperature control medium is greatly improved and facilitated over old constructions.

With the foregoing and other objects in view I have devised a construction several embodiments of which are illustrated in the accompanying drawing forming a part of this specification, it being however understood that the invention is not limited to the specific construction and arrangement shown but may involve various changes and modifications within the scope of the invention.

This application is a continuation in part of my prior applications Serial No. 357,107, filed September 17, 1940, and Ser. No. 408,267, filed August 25, 1941.

In the accompanying drawing:

Fig. 1 is a vertical section through an antifriction bearing constructed according to my invention and showing diagrammatically one form of heat exchange mechanism for maintaining the proper temperature for the temperature control medium employed in the bearing;

Fig. 2 is a similar section of one portion of the bearing showing a slight modification;

Fig. 3 is a similar section showing a different form of heat control means, and

Fig. 4 is a similar section illustrating another form of temperature control means.

The present standardized antifriction bearing construction consists of two special alloy steel rings between which the rolling elements run and hardened and normalized to produce an extremely hard surface for the balls or other rolling elements to roll upon in carrying the load. This extreme degree of hardness was found to be of first importance to carry the rated load of the bearing and as necessary to prevent damage to the ring raceways by denting from the ball or roller, or by imprinting from them through rough handling or abuse of the equipment in which the bearing was mounted. This will be readily apparent when it is realized that there is a very small area of the ball or roller in contact with the raceway surface which must carry the load imposed.

The manufacture of these bearings involves turning the bearing rings of very tough steel from heavy bars, forgings or from very heavy steel tubes, with a waste of nearly one-half or over (depending on the size) of the weight of the steel in chips, cut-off ends, etc. Furthermore they require many additional finishing operations, including a large number of chucking operations as well as actual work on the metal surfaces to bring the piece to the finished size.

The mounting of such bearings in the housing or frame of a machine or other apparatus comprises a complicated construction involving a number of parts which require a number of chucking and other operations. Not only in manufacturing but also in assembling, these multiple operations introduce many errors and variables, such for example as those of wobble and eccentricity, which are cumulative and show up in the finished assembly. They make it very difficult to assure exact alignment of the bearing ring and accurate mounting of the bearing in the housing or frame in relation to the other parts. Also in the mountings used for such bearings it is difficult to incorporate temperature control means, and particularly to locate such means sufficiently near to the raceway ring to secure effective and efficient heat transfer, and even if sufficient space were available for application of a temperature control means, the available structures are extremely complicated and cannot be applied in such manner as to secure efficient and satisfactory operation.

My invention eliminates the greater proportion of these variations and difficulties both in manufacturing and assembling. It also provides a construction in which temperature control means may be incoporated closely adjacent the raceway ring and the rolling elements, and also in which the heat transfer from the rolling elements and the raceway ring is greatly improved and facilitated and therefore is much more efficient than is possible with the standard solid bearing.

I have found that a raceway surface can be provided and maintaned at the present necessary degree of hardness in a ring of the special tough steel of a thickness, as provided by the stress formulas of Streibeck and Hertz, to carry the rolling load, and that the small balance of the usual size bearing ring shape can be made of softer and more readily workable material than the tough machining alloy steel at present used in the solid bearing members, as the load carried by the raceway ring would be distributed over large areas. Because of this construction the remaining portion of the bearing carrying the raceway ring can be formed or molded and thus extended to the shape and size of the mounting for the bearing, which may be directly located and mounted on the housing of the motor or generator, or machine housing or frame. This remaining portion of the bearing can also be constructed to incorporate the heat transfer means closely adjacent the raceway ring providing better and more uniform heat transfer and therefore better and more uniform control of the temperature of the bearing.

This raceway ring of tough hardened steel or similar material can be cast or molded in a supporting or mounting ring member which is also formed to provide a mounting or locating face or surface accurately located with respect to the surface of the raceway for the rolling elements. This mounting face or surface may be seated on and accurately aligned and located on an accurately located mounting surface on the housing or frame of the machine or other apparatus, so that the simple operation of placing this ring assembly and mounting it on such surface on the housing or frame may be easily and quickly performed, and will insure accurate and proper locating and aligning of the bearing, and particularly the raceway for the rolling elements, in the housing or frame and in relation to the other elements of the machine or apparatus. This cast or molded supporting member may also have incorporated in it the heat transfer means for controlling the temperature of the bearing. The raceway ring of tough hardened steel or similar material can be cast or molded in the supporting or mounting ring member in a die casting machine, plastic molding machine, by the permanent mold method or the centrifugal mold method, to produce an integral bearing ring structure which may be directly mounted and accurately located in the housing frame or other support and having an insert raceway ring of the necessary hardness and toughness. This permits the use of softer and cheaper material for the cast or molded or otherwise formed ring support, and the insert raceway ring of tough hardened steel or similar material can be cast or molded into this material or otherwise permanently bonded thereto and properly and accurately positioned and anchored in or bonded to the supporting material by the casting and molding operations, or bonded by some other means to a preformed supporting and mounting ring, such for example as copper brazing in a controlled atmosphere. At the same time the conduits or supports for the heat transfer medium may be cast or molded in this backing or supporting member. This construction eliminates a large number of chucking and finishing operations required in making the standard antifriction bearing, insuring greater accuracy with less difficulty and liability of error, particularly the proper locating of the raceway for the rolling elements with respect to the finished surfaces of the housing, giving a better and more reliable construction and one which can be manufactured and assembled at less cost. A particular advantage is that the heat transfer means may be made an integral part of the backing and supporting member and located closely adjacent the raceway ring for more uniform and efficient heat transfer. The fact that the ring is permanently bonded to the material of the backing and supporting member, particularly where there is a fused bond, permits the highest degree of rapid heat transfer to take place and much more rapid and efficient transfer than where the members are not so bonded.

Referring first to Fig. 1, the bearing shown comprises the raceway or track ring 5 having a raceway or track 6 for the rolling elements, such as in this case balls 7, although of course any desired type of antifriction bearing may be used, such for example as flat or cylindrical rollers, tapered, thrust or any other type, as may best be suited to the particular application. This ring is mounted in and supported by the backing up and supporting member 8 to which the ring 5 is permanently bonded. The ring 5 is ordinarily made of the special tough steel alloys now generally employed for the ring members of the standard ball and roller bearing and which can be treated to give the necessary hardness to the surface on which the rolling elements roll. These rings can be cut from steel tubing of the proper size and formed to shape, or they may be made from strip steel rolled into a circle and welded at the abutting ends to make a one-piece solid ring, or made from flat wire or sheet or seamless swaged or welded pipe or tubing, which illustrates some of the possible forms of fabrication. They can also be made by cold forming, by hot or cold steel fused at the ends to make a fully continuous ring, by stamping, turning, or forging methods, etc., as may best lend itself to the particular size, quantity, application, or condition of manufacture.

The ring is properly finished and hardened and is then held in the proper location in a mold by suitable holding and locating means and the other material forming the backing and supporting material of the member 8 is poured into the mold about the ring with a suitable pressure. This material may be cast or molded about the ring in any suitable manner, such for example as in die-cast molds in die-casting machines, suitable molds in plastic molding machines, by casting in permanent molds, by casting by centrifugal mold methods, or powdered metal pressure molding or casting. It is preferred that the surface of the insert ring 5 at the opposite side from the rolling track or raceway for the balls or other rolling elements be knurled or otherwise roughened as indicated at 9 so that the cast or molded material will run into the depressions into the knurled or roughened surface to form a better bond between the insert raceway ring and the backing up or mounting material. Thus the raceway ring is permanently bonded to the backing and supporting ring section so that it cannot be shifted or removed, and there is also a certain amount of fused bonding between the contacting surfaces, the depth of fusing depending on the materials used.

Another way in which the ring may be mounted and permanently bonded to the backing and supporting section is by preforming the section and securing the ring thereto through copper brazing in a controlled or neutral atmosphere, as described in the prior applications above noted. This also makes a fused bond between the members, and the fused bond, both in the casting and latter methods greatly facilitates the transfer of heat between the two members, which is a material advantage of this construction as employed in the controlled temperature bearing structures.

The backing and supporting member 8 includes a body or circular ring section 10 and suitable mounting extensions such for example as a flange portion 11 integral with the central portion 10 and projecting laterally therefrom in the proper position and properly shaped for mounting the bearing on any suitable supporting member such as a housing or frame of a machine or other apparatus indicated at 12 and secured thereto by any suitable means, such as the bolts 13. This portion 11 has a mounting face or surface 14, and also in addition if desired another surface 15, accurately positioned and aligned with respect to the insert ring 5 and particularly the raceway or track surface 16, and this accurate relative location and alignment of these surfaces can be readily secured and maintained in the molding or casting operation with practically no finishing operation. The assembled bearing can be quickly and accurately mounted in the frame or other supporting member 12 by merely placing the member 8 on the surface 16 of this support and securing it thereto by the securing means. The surface 16 in the frame or support is accurately located and aligned with the axis of the shaft 17 as may also be the surface 18, although if desired there may be a clearance between the surfaces 15 and 18 so that the surfaces 14 and 16 are relied on for accurately locating the bearing, in which case the surfaces 15 and 18 would require only rough finishing and would act as a rough centering means for the bearing at the time of assembling. The bored surface 16 (and also 18 if desired) is in accurate and exact alignment with the desired location of the shaft and with respect to other members or parts of the machine or mechanism with which it is used. Therefore when the bearing is mounted or assembled on the support it is automatically accurately located and aligned with respect to the shaft, the support and other elements.

An important part of the present construction is means incorporated in the bearing for controlling the temperature thereof. Cast or molded within the member 8 are temperature control coils 19, these coils being also bonded at their outer surfaces to the material of the member 8 by a thin fused bonding during the molding or casting operation, which also greatly facilitates the transfer of heat between these coils and the material of the member 8. It will be seen these coils can be located closely adjacent the raceway ring 5 so that the highest degree of rapid heat transfer may take place. They could be located in the inner ring section 20 of the bearing, but as the outer ring section 8 provides a much greater surface to assure rapid heat transfer and more space is available for this member, it is preferred to place them in this outer member. The ends of the coils 19 indicated at 21 and 22 may be connected to outside tubing or pipe 23 and 24 or associated parts as desired for the particular design to complete the flow circuit for adding or removing heat, depending on the conditions of operation. Thus in the drawing is shown a heat exchange device 25 of any suitable type to which the pipes 23 and 24 are connected and through which the heating or cooling medium may be circulated by a pump 26. If it is a cooling medium for cooling the bearing, cool air may be circulated over the heat exchanger 25 by any suitable fan 27 operated by a motor 28, or if it is to heat the bearing some heating fluid may be circulated through the heat exchanger, or it could be heated by a burner, electric heating unit or other heating means, as will be understood. Oil, water, non-freezing solutions or other fluids, etc., may be used in the flow circuit for either heating or cooling the bearing and therefore controlling the temperature thereof. If desired the temperature of the circulating material may be controlled and maintained at the proper level by thermostatic or other automatic control, not shown.

The intimate bond between the insert ring 5 and the material of the backing and supporting member 8 greatly increases the rate of transfer of heat between them. Particularly is this true where there is a fused bond between them as this makes them practically an integral structure.

Seals or other means 29 of retaining lubricant within the bearing and keeping out foreign matter of solid or fluid form assure the clean normal operation of the bearing for many thousands of hours of service without attention.

This process and construction uses the same basic function for its bimetallic and bimaterial construction as the present standardized antifriction bearing construction as far as sizes and materials of the raceway ring, balls and retaining elements are concerned. That is, no attempt is made to alter the function of the balls or rolling elements.

The improved bearing steels of today make possible far greater load carrying capacity for a given bearing size load rating so successfully established and accepted by all industries over the entire world. These established sizes therefore do not require a bearing ring thickness as great as when the sizes were initially established. A small part of the standard size ring may therefore be made of other material without affecting the proper raceway load carrying function. Thus in this construction the required small balance of the standard section over that of the raceway ring may be supplied by softer and more easily workable material yet fully capable of conservative support of a required load, the backing up material, however, being of a degree of hardness to withstand the load from the raceway ring without materially changing its repose dimensions. This makes possible major reductions in the cost of fabrication of the bearing and makes possible a much more effective and efficient as well as simple construction and arrangement for controlling the temperature of the bearing. The insert or raceway ring 5 is made of a thickness at its thinnest point 30 to carry the rolling load as conservatively figured by the established formulas of Streibeck and Hertz for standard solid one-piece bearings so that this insert ring is capable of carrying the normal rolling load independently of the backing or suporting member.

It will be seen that the insert ring 5 forming a raceway or track for the rolling elements is of less width than the supporting or backing member 8 so that the sides 31 of the insert ring are spaced inwardly of the sides 32 and 33 of the backing member. It will also be noted that the diameter of the face 34 of the insert ring on which the raceway or rolling surface 6 is located is of a different diameter from that of adjacent surface 35 of the backing or supporting ring member with which it is associated so that this face of the insert ring is spaced above or inwardly of that of the backing member. This arrangement eliminates the necessity of accurately finishing and lining up the side surfaces 31 of the insert ring, doing away with a large number of chucking operations required in finishing the one-piece solid bearing now generally employed. The elimination of a large number of chucking operations thus greatly reduces the cost of manufacture, increases the percentage of bearings which are constructed to proper dimensions, thus decreasing the percentage of rejected bearings, and secures the necessary accuracy with less difficulty. The arrangement also provides plenty of space for the sealing members 29 and plenty of space within the bearing for holding and retaining sufficient lubricant for indefinite efficient operation.

Because the face 34 having the track or raceway is spaced above the adjacent surfaces 35 of the backing member a portion of each side of the insert ring is exposed and not covered by the metal or material of the backing member. These uncovered surfaces are important as providing gripping surfaces to be properly gripped and hold the insert ring in the die by suitable holding means during the casting and molding operation and also for later grinding and finishing of the raceway. If the insert ring is merely slid or forced onto the die pin it is very apt not to be held in the proper position during the casting or molding operation, because as soon as the hot metal or other material hits it, it is heated and expands faster than the large bulk of the die pin and therefore the ring loosens on this pin and is liable to be tilted sideways or otherwise forced out of position by the pressure of the material or the metal forced into the mold. With this present construction the insert ring can be gripped and held in the mold by its opposite sides 31 with no danger of its being loosened by heating from the die-casting metal or other material and then forced out of position by the pressure of this metal or other molding material.

Because the ring can be so gripped and held either during molding or casting operation or for finishing of the raceway, a large number of chucking operations are avoided which are necessary in the solid or one-piece bearing now generally employed, thus doing away with a large number of variables in the standard bearing and its mounting that cause such unsatisfactory performance as to lead to rejection by the customer. Basically these variables are due to the many chucking operations required for the many step-by-step operations needed in finishing the bearing ring of the present standard methods of ball bearing manufacture, and also the variables and errors by the many chucking and finishing operations in making the multiple parts of the mountings for these bearings. These errors or variables are cumulative, resulting in misalignment, cocking of the bearing, wobble and eccentricity, etc. This also applies to all types of ball, roller and thrust bearings. It will be evident that the diameter surfaces of the rings must be parallel, that the ring surfaces must be parallel, and that the raceways must be parallel with both faces and diameter, and that all must be concentric (not eccentric) with each other for uniform or successful bearing performance. If these qualities are not rigidly maintained, wobble of the rings, of the faces, of the diameters, or other errors or combinations of these faults will quickly cause bearing failure and wreckage of the bearing.

In the present construction, however, the backing member 8 and raceway ring 5 form a standard proportioned bearing as far as the rolling elements and their raceway or track support is concerned, with the backing or outer section cast, molded or bonded to the raceway ring and having integral therewith the parts formed with mounting surfaces in exact position and alignment with reference to the raceway surface for the rolling elements, and this desired relation can be combined with a simple and effective means for controlling and maintaining the proper temperature for the bearing. This is a simple construction in spite of these advantages in which a large proportion of the finishing operations required in the usual construction of the bearing ring and the mounting for the bearing in its support are eliminated. At high speeds this provides a far greater degree of smoothness of operation, as a great proportion of all factors of machine error, such for example as wobble and eccentricity, are entirely eliminated.

The inner section of the bearing comprising the insert ring 5a and its backing up and supporting member 20 is constructed as described in my prior application Serial No. 408,267 above noted, the raceway ring being the same as ring 5 except reversed to form the opposed track or raceway for the rolling elements.

The same basic features are employed in the modified forms shown in the other figures. In Fig. 2, instead of having the circulating passage for the temperature controlling medium a separate pipe or tubing, as shown in Fig. 1, they are formed as conduits 36 cored and cast directly in the material of the backing member 8. Otherwise the construction and arrangement is the same as Fig. 1.

In Fig. 3 the similar passages 37 are cast or molded in the backing member 8a, but instead of circulating a fluid through them as the temperature controlling medium, an electric heating unit 38 may be located in these passages and supplied from any suitable source of current through any suitable type of control, either automatic or manual, indicated diagrammatically at 39. If the member 8a is of metal, then the unit should be insulated therefrom by any suitable insulating means 40, but if the member 8a is of a molded plastic or other non-electrical conductor the heating element could be directly in contact with the material for even more efficient transfer of heat.

In Fig. 4 instead of having heating or cooling conduits cast into the backing member 8b a series of radiating fins 41 may be cast, recessed in and bonded to the outer surface of the body or ring portion 42 of the backing and supporting member and brought closely adjacent to the insert or raceway ring 5 supported in and bonded to the material of the member 42 for rapid heat transfer. If cooling air or other fluid is passed over these fins the bearing will be efficiently cooled, but if heating liquid or fluid is passed over them or they are otherwise heated, the bearing may be accordingly heated.

The great advantages of this simple construction are apparent when we consider bearing needs for such devices as hot continuous ovens of process industries, annealing, brazing, paint-drying, etc. Also further important applications are bearings for railway cars such for example as generators operating in severe cold, airplanes stored in sub-zero winter weather with all the auxiliary equipment required to start at high speed and function perfectly. Others are fire-control and other controlling equipment operating in severe temperatures. The type of Fig. 3 using electrical equipment is particularly valuable for supplying heat for a short time to make positive starting easy in cold weather, or in emergencies it will be of great help in all types of mechanized equipment.

Especial attention is drawn to that of aircraft engine applications using a supercharger having bearings running at very high temperatures, which seriously involve lubrication and temper of the steel of the bearings causing them to change size dimensionally in some instances. This can be simply and completely controlled by use of this temperature controlled bearing, either connected to the engine cooling system or other cooled liquid or by separate cooling coil if of air-cooled type. Also in aircraft cabin supercharger bearings which run at high speeds and with very high temperatures in the bearings, making them sensitive to operation, all of which can be most simply controlled by use of this temperature controlled bearing and connecting to a cooling coil to suit the application, or leading from the pressure exhaust from the blower to the cooling coils in the bearing.

In each construction the insert raceway rings may be made of tough hardened steel or other suitable hardened metal, the balance of the bearing members consisting of the backing up and supporting ring section and the integral mounting extensions can be made of softer, more readily workable materials than the tough hard alloy metal required for the insert raceway ring, as the load from these insert rings is distributed over large areas. Thus the backing and supporting material for the insert raceway ring to support and assist in preventing distortion of these rings as well as hold them accurately in the proper position can be of a softer alloy or other molded or cast material. This backing material may be of die casting materials and alloys such for example as zinc, magnesium, aluminum, brass or bronze alloys in common use which have excellent physical properties for this compression service, and the backing-up ring members can be made in a die-casting machine, plastic molding machine, by permanent mold method, or the centrifugal mold method, etc.

The powder molding methods are particularly adapted for making the backing member and forming it about the raceway ring. This includes powder metallurgy and powder plastics in the many ways of applying them. Thus for example they may include their use as pure powders handled under very high pressures as in powder metallurgy, or the molding of metal powders mixed with a proper percentage of a suitable binder under great pressure in molds, the binder acting as a bond for the metal particles. The use of metallic powders has particular value in this invention to insure rapid conduction of heat away from the bearing under heavy operating conditions of load or speed than would be possible with non-metallic plastics or similar materials.

To produce the backing up members having inserted raceway rings the insert rings can be suitably held and accurately positioned in the dies or mold and the liquid or powdered metal poured or cast about them or molded under pressure to produce a finished ring formed accurately to size and the mounting surfaces accurately located and aligned, so that only sizing operations may be necessary.

In the final finishing the flange 11 may be clamped in the chuck or holder or against the table of the machine and located by the surfaces 14 or 15. Then the track surface 6 can be ground to the desired finish or size and it can be readily finished in exact radial and axial concentric alignment with the surfaces 14 or 15 or either of them. Also the bearing may be gripped and held by the exposed surfaces 31 on the opposite sides of the track or raceway ring 5 during the final finishing, as turning or grinding, of the surfaces 14 and 15 and finishing or grinding of the track or raceway surface 6. Therefore these surfaces can be readily finished and located in exact radial and axial concentric alignment with each other, as in both cases they may be finished in the same single chucking operation or set up. Therefore when the bearing is mounted on the mounting surface of a housing or frame and located by either of the surfaces 14 and 15 the track or raceway is automatically accurately located in the housing or frame.

It is to be noted that this two-material ring construction wherein the raceway surface provides a very hard standard surface for the balls or rollers of any type of bearing, may have the backing ring or section of very light material cast, molded or bonded to the raceway ring, assuring the very lightest possible weight for such construction applications as aircraft, as well as decrease in the time required to manufacture and the amount of steel required in the manufacture, thereby conserving vital materials which may be required for other purposes.

I am not, however, limited to the use of metal for the backing-up or mounting rings or sections, but may use other molding materials, as liquids, powders or plastics under high pressure or by centrifugal force. Thus in addition to the metals and the alloys mentioned may be used acrylic, cellulose acetate, phenolic resins, urea, vinyl, etc., among the various molding plastics, and the mild soft steels, hard steel alloys, manganese bronzes or other high melting point alloys for the centrifugal permanent mold casting method, and for powdered metals molded under high pressure either with or without the binder.

The backing and supporting material brings the bearing to standard size and the raceway ring is permanently bonded to it or inseparably mounted on it. The terms "bonded" or "inseparably mounted" include casting, molding or forming the backing material about or against the ring, controlled atmosphere brazing, brazing, sweating and soldering, or otherwise bonding or connecting so they are inseparable in use and in effect one piece.

Throughout the specification and claims I have used the terms "casting" and "molding" as practically synonymous, as castings are formed and shaped in molds and therefore casting is broadly a molding operation. Also, shaping and molding such materials as the non-ferrous plastics and powdered metal may be broadly called a casting operation as they are shaped in molds.

Although hardened steel has been mentioned as the material that would probably be most generally used for the insert raceway ring, it is to be understood that the invention is not limited to the use of this material. Thus, for example, stainless steel is often required, or the use of bronze or glass may be required as materials for special jobs, such as would be needed on process industries in the presence of acid in gaseous or liquid form.

In all cases, the backing material is of a degree of hardness to support the load from the raceway ring without change from its repose dimensions as contrasted with a yieldable backing for vibration dampening applications.

The track ring may be bonded to the backing member by copper brazing in a controlled atmosphere where the backing member is of a metal of sufficiently high melting temperature that it would not be melted by the heating operation.

Having thus set forth the nature of my invention, what I claim is:

1. A device of the character described comprising a bimaterial unitary structure including a supporting and mounting member comprising a body portion and an integral flange extending radially therefrom forming a supporting and mounting means for the member, a single one piece preformed continuous hardened metal anti-friction bearing raceway ring mounted in the body portion forming a track for the rolling elements and of sufficient thickness to carry the normal rolling load, said supporting and mounting member being of different material than the raceway ring but of a degree of hardness to withstand the load from the ring without materially changing its repose dimensions, said flange being provided with a locating and mounting surface adapted to seat on a supporting surface on a supporting housing or frame to locate the ring in the housing or frame, said ring having an outer surface permanently bonded to the material of the body to hold it permanently in a given position in the supporting member whereby the track surface may be finished with respect to said locating and mounting surface after mounting of the ring in the supporting member and bonding it thereto so that the track may be located in exact axial and concentric alignment with the locating and mounting surface, and heat transfer means incorporated in the body portion closely adjacent the raceway ring so that it is responsive to small temperature changes in the ring to control the temperature thereof and maintain the track in axial and concentric alignment with the locating and mounting surface.

2. A device of the character described comprising a bimetal unitary structure including a supporting and mounting member comprising a body portion and an integral flange extending radially therefrom forming a supporting and mounting means for the member, a single one piece preformed continuous hardened metal anti-friction bearing raceway ring mounted in the body portion forming a track for the rolling elements and of sufficient thickness to carry the normal rolling load, said supporting and mounting member being of different metal from the ring pressure cast to substantially finished size and shape against the ring but of a degree of hardness to withstand the load from the ring without materially changing its repose dimensions, said flange being provided with a locating and mounting surface adapted to seat on a supporting surface on a supporting housing or frame to locate the ring in the housing or frame, said ring having an unfinished outer surface permanently bonded to the metal of the body to hold it permanently in a given position in the supporting member whereby the track surface may be finished with respect to said locating and mounting surface after mounting of the ring in the supporting member and bonding it thereto so that the track may be located in exact axial and concentric alignment with the locating and mounting surface, and heat transfer means incorporated in the body portion closely adjacent the raceway ring so that it is responsive to small temperature changes in the ring to control the temperature thereof and maintain the track in axial and concentric alignment with the locating and mounting surface.

3. A device of the character described comprising a bimaterial unitary structure including a supporting and mounting member comprising a body portion and an integral flange extending radially therefrom forming a supporting and mounting means for the member, a single one piece preformed continuous hardened metal anti-friction bearing raceway ring mounted in the body portion forming a track for the rolling elements and of sufficient thickness to carry the normal rolling load, said supporting and mounting member being of different material from the ring pressure molded against the ring but of a degree of hardness to withstand the load from the ring without materially changing its repose dimensions, said flange being provided with a locating and mounting surface adapted to seat on a supporting surface on a supporting housing or frame to locate the ring in the housing or frame, said ring being of less width than the body portion so that its side walls are spaced inwardly of the opposite side walls of the body portion and the diameter of its face having the track being different from that of the corresponding face of the body portion so that it is spaced above this latter face, said ring having an unfinished outer surface permanently bonded to the material of the body to hold it permanently in a given position in the supporting member whereby the track surface may be finished with respect to said locating and mounting surface after mounting of the ring in the supporting member and bonding it thereto so that the track may be located in exact axial and concentric alignment with the locating and mounting surface, and heat transfer means incorporated in the body portion closely adjacent the raceway ring so that it is responsive to small temperature changes in the ring to control the temperature thereof and maintain the track in axial and concentric alignment with the locating and mounting surface.

4. A device of the character described comprising a bimetal unitary structure including a supporting and mounting member comprising a body portion and an integral laterally extending portion forming a supporting means for the member, a single one piece preformed continuous hardened metal anti-friction bearing raceway ring mounted in the body portion forming a track for the rolling elements and of sufficient thickness to carry the normal rolling load, said supporting and mounting member being of different metal than the raceway ring pressure cast against the ring and of a degree of hardness to withstand the load without materially changing its repose dimensions, said laterally extending portion being provided with a locating and mounting surface adapted to seat on a supporting surface on a supporting housing or frame to locate the ring in the housing or frame, said ring being of less width than the body portion so that its side walls are spaced inwardly of the opposite side walls of the body portion and the diameter of its face having the track being different from that of the adjacent surface of the body member so that it is spaced above this latter member, said raceway ring having an unfinished outer surface permanently bonded to the metal of the body to hold it permanently in a given position in the supporting member whereby the track surface may be finished with respect to said locating and mounting surface after mounting of the ring in the supporting member and bonding it thereto so that the track may be located in exact axial and concentric alignment with the locating and mounting surface, and heat transfer means incorporated in the body portion closely adjacent the raceway ring so that it is responsive to small temperature changes in the ring to control the temperature thereof and maintain the track in axial and concentric alignment with the locating and mounting surface.

5. A device of the character described comprising a bimetal unitary structure including a supporting member, a single one piece preformed continuous hardened metal anti-friction bearing raceway ring mounted in said member forming a track for the rolling elements and of sufficient thickness to carry the normal rolling load, said supporting and backing member being of different metal pressure cast against the ring and provided with a locating and mounting surface adapted to seat on a supporting surface on a supporting housing or frame to locate the ring in the housing or frame, said ring having an outer surface permanently bonded to the metal of the supporting member to hold it permanently in a given position in said member whereby the track surface may be finished with respect to the said locating and mounting surface after mounting of the ring in the supporting member and bonding it thereto so that the track may be located in exact axial and concentric alignment with the locating and mounting surface, and heat transfer means incorporated in the supporting member closely adjacent the raceway ring so that it is responsive to small temperature changes in the ring to control the temperature thereof and maintain the track in axial and concentric alignment with the locating and mounting surface.

GEORGE H. KENDALL.